United States Patent
Dibiasi et al.

(10) Patent No.: US 7,180,617 B2
(45) Date of Patent: Feb. 20, 2007

(54) PRINTING SYSTEM AND METHOD

(75) Inventors: John Dibiasi, Shelton, CT (US); Lisa D. Burns, Vernon, CT (US); Allen Joslin, Norwich, CT (US); Steven C. Hoffman, Sandy Hook, CT (US)

(73) Assignee: Metavante Corporation, Milwaukee, WI (US)

( * ) Notice: Subject to any disclaimer, the term of this patent is extended or adjusted under 35 U.S.C. 154(b) by 569 days.

(21) Appl. No.: 09/861,339

(22) Filed: May 18, 2001

(65) Prior Publication Data

US 2002/0171869 A1   Nov. 21, 2002

(51) Int. Cl.
*G06F 15/00* (2006.01)
(52) U.S. Cl. .................... 358/1.15; 358/1.18
(58) Field of Classification Search ........... 358/1.15, 358/1.18
See application file for complete search history.

(56) References Cited

U.S. PATENT DOCUMENTS 5,880,453 A * 3/1999 Wang et al. ............ 235/462.01
6,192,117 B1 * 2/2001 Stephan .................. 379/114.18
6,665,090 B1 * 12/2003 Hall et al. ................ 358/1.18
6,732,152 B2 * 5/2004 Lockhart et al. ............ 709/206

* cited by examiner

*Primary Examiner*—Douglas Q. Tran
*Assistant Examiner*—Chan S. Park
(74) *Attorney, Agent, or Firm*—Reinhart Boerner Van Deuren s.c.

(57) ABSTRACT

A printing system includes: a data storage device configured to store data representing a plurality of elements; a creation device configured to define at least one piece of printed material, the at least one piece of printed material including at least one of the plurality of elements; and a data processing device configured to read from the data storage device the data corresponding to the at least one of the plurality of elements in accordance with the at least one piece of printed material defined by the creation device and to generate data representing the at least one piece of printed material.

A printing method includes the steps of: storing data representing a plurality of elements in a data storage device; defining at least one piece of printed material, the at least one piece of printed material including at least one of the plurality of elements; reading from the data storage device the data corresponding to the at least one of the plurality of elements in accordance with the at least one piece of printed material defined in the defining step; and generating data representing the at least one piece of printed material.

48 Claims, 1 Drawing Sheet

PRINTING SYSTEM AND METHOD

FIELD OF THE INVENTION

The present invention relates to a printing system and a printing method.

BACKGROUND INFORMATION

The literature is replete with descriptions of printing systems and printing methods. In certain conventional printing systems and methods, data representing the printed material is assembled, generated and transmitted to a printing device. One disadvantage of these systems and methods is the storage capacity and bandwidth required to store and transmit such data.

It is therefore an object of the present invention to provide a printing system and printing method requiring a relatively low storage capacity and bandwidth.

It is another object of the present invention to provide a printing system and method in which data representing the elements contained in the printed material is stored in a storage device and in which the printed material is defined in accordance with these elements.

It is yet another object of the present invention to provide a printing system that includes: a data storage device configured to store data representing a plurality of elements; a creation device configured to define at least one piece of printed material, the at least one piece of printed material including at least one of the plurality of elements; and a data processing device configured to read from the data storage device the data corresponding to the at least one of the plurality of elements in accordance with the at least one piece of printed material defined by the creation device and to generate data representing the at least one piece of printed material.

It is still another object of the present invention to provide a printing method that includes the steps of: storing data representing a plurality of elements in a data storage device; defining at least one piece of printed material, the at least one piece of printed material including at least one of the plurality of elements; reading from the data storage device the data corresponding to the at least one of the plurality of elements in accordance with the at least one piece of printed material defined in the defining step; and generating data representing the at least one piece of printed material.

SUMMARY

The above and other beneficial objects of the present invention are most effectively attained by providing a printing system and method as described and claimed herein.

In one example embodiment of the printing system according to the present invention, the printing system includes: a data storage device configured to store data representing a plurality of elements; a creation device configured to define at least one piece of printed material, the at least one piece of printed material including at least one of the plurality of elements; and a data processing device configured to read from the data storage device the data corresponding to the at least one of the plurality of elements in accordance with the at least one piece of printed material defined by the creation device and to generate data representing the at least one piece of printed material.

In one example embodiment of the printing method according to the present invention, the method includes the steps of: storing data representing a plurality of elements in a data storage device; defining at least one piece of printed material, the at least one piece of printed material including at least one of the plurality of elements; reading from the data storage device the data corresponding to the at least one of the plurality of elements in accordance with the at least one piece of printed material defined in the defining step; and generating data representing the at least one piece of printed material.

DETAILED DESCRIPTION

Figure 1:
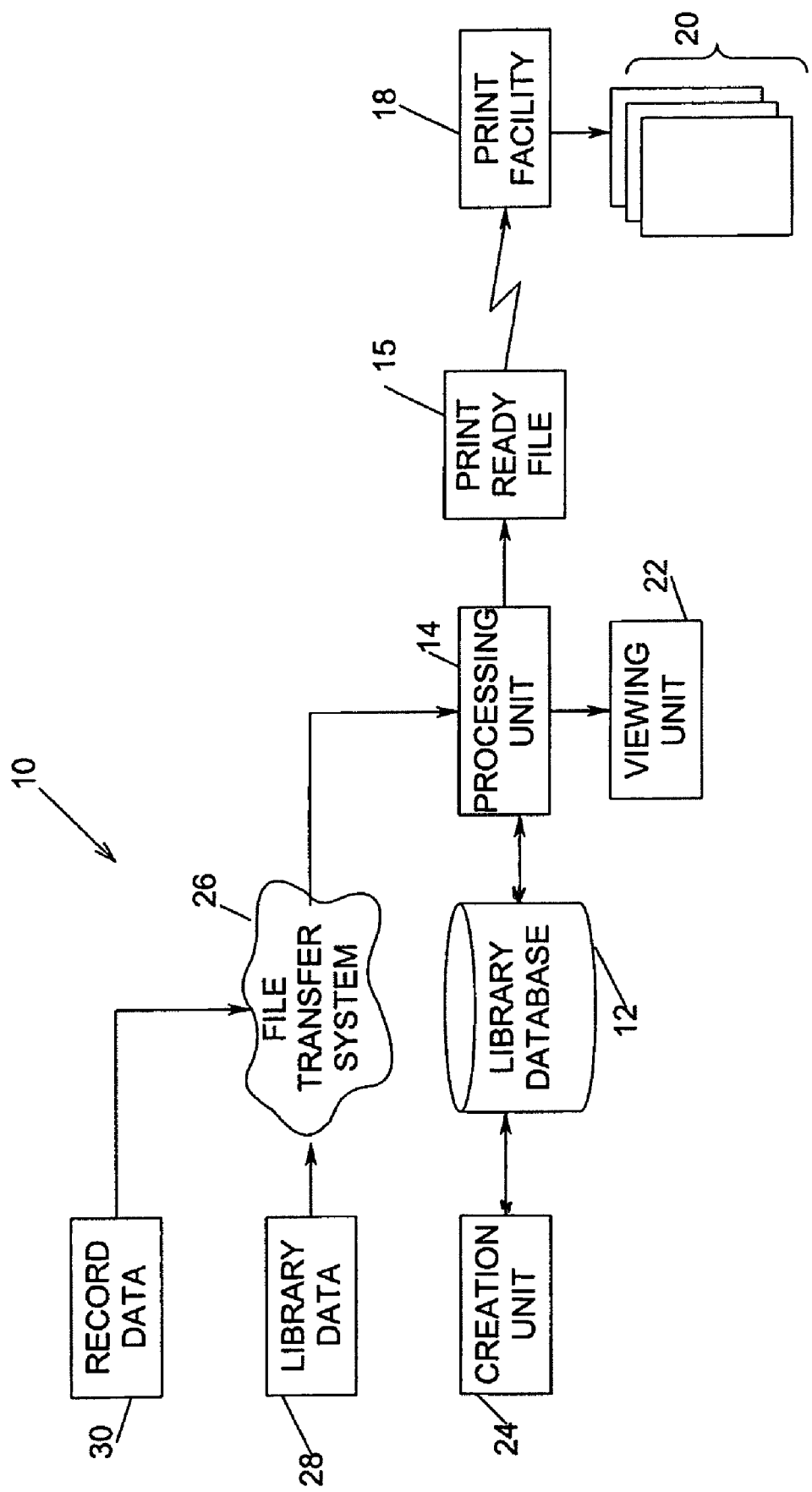
FIG. 1 is a schematic view illustrating a printing system according to the present invention.

Those skilled in the art will gain an appreciation of the present invention from a reading of the following description when viewed in conjunction with the accompanying drawing of FIG. 1, which schematically illustrates a printing system 10 according to the present invention. As illustrated in FIG. 1, the printing system 10 includes a processing unit 14, which may include, for example, a data processing device, a storage device, an input device, an output device, etc. The storage device may include, for example, one or more of a magnetic memory device, an electronic memory device, an optical memory device, a magneto-optical memory device, a removable memory device, a permanent memory device, etc. The input device may include, for example, one or more of a keyboard, a mouse, a pointing device, a touch screen, a trackball, a microphone, etc., and the output device may include, for example, one or more of a display device, a printing device, a speaker, etc. The processing unit 14 is configured to communicate with and receive data from a library database 12 and to communicate with a file transfer system 26. The file transfer system 26 may include, for example, one or more of an Internet, an intranet, a network, a private network, a public network, a virtual private network, a dedicated connection, a non-dedicated connection, a direct connection, an indirect connection, a dial-up connection, a permanent connection, a temporary connection, a wired communications link, a wireless communications link, a satellite communications link, a telecommunications link, a magnetic tape, a magnetic medium, etc. As illustrated in FIG. 1, the processing unit 14 is configured to receive record data 30 via the file transfer system 26, and the library database 12 is configured to receive library data 28 via the file transfer system 26. It should be understood that the processing unit 14 may be configured to receive the library data 28 via the file transfer system 26 and to communicate the received library data 28 to the library database 12. The library data 28 may include, for example, data representing an image, a text block, a layout, etc. as more fully set forth below. This library data 28 is stored in the library database 12 for use in producing the printed material 20 as also more fully set forth below.

The printing system 10 according to the present invention further includes a creation unit 24, which may be configured for, inter alia, creating, defining, maintaining and/or revising content that is used in producing the printed material 20, as described below. The content may include, for example, formatted content, and the creation unit 24 may communicate with the library database 12 via, for example, one or more of an Internet, an intranet, a network, a private network, a public network, a virtual private network, a dedicated connection, a non-dedicated connection, a direct connection, an indirect connection, a dial-up connection, a permanent connection, a temporary connection, a wired communications link, a wireless communications link, a satellite communications link, a telecommunications link, a magnetic tape, a magnetic medium, etc. The creation unit 24 may be configured to create formatted content elements via an online system. The creation unit 24 may include a security feature that requires a login procedure or other authentication procedure to be performed prior to and as a condition to communication between the creation unit 24 and the library database 12.

The record data 30 may include data relating to the printed material 20, such as, for example, data relating to a recipient of the printed material 20 and data relating to the content of the printed material 20. The record data 30 relating to the content of the printed material 20 may include at least one identifier data corresponding to respective data contained in the library database 12. The processing unit 14 is configured to read from the library database 12 the library data 28 corresponding to the identifier data included in the record data 30. Thus, according to the present invention, a library of components, e.g., graphic elements, text elements, layout elements, style elements, etc., may be defined and stored in the library database 12, and any selected ones of these components may be included in the printed material 20 in accordance with the data contained in the record data 30. It should be appreciated that the record data 30 itself may not include the data representing these selected ones of the components but rather may include only identifiers corresponding to the selected ones of the components, the actual data representing the selected one of the components being read by the processing unit 14 from the library database 12.

The processing unit 14 is configured to read the selected ones of the library data 28 stored in the library database 12 in accordance with the record data 30 and to output data representing a print-ready file 16 in accordance with the selected ones of the library data 28 read from the library database 12. The library data 28 may also be included on the basis of business rules as encoded in accordance with certain computer software programs. The record data 30 may include additional data, such as, for example, data relating to the recipient of the printed material 20, data relating to a layout, a style, an appearance, a type, etc. of the printed material 20, etc. The processing unit 14 is configured to output the print-ready data 16 in accordance with any such additional data contained in the record data 30.

For example, the record data 30 may include data representing a recipient's name, data representing the recipient's identification number, data representing at least one graphic image stored in the library database 12 and data representing that the printed material 20 is a telephone calling card. The processing unit 14 thus reads the library data 28 from the library database 12 corresponding to the at least one graphic image identified in accordance with the record data 30, reads the library data 28 from the library database 12 corresponding to the layout, style, appearance, etc. of a telephone calling card in accordance with the record data 30 and outputs the print-ready data 16 in accordance with the library data 28 so read from the library database 12 and in accordance with the additional data contained in the record data 30, i.e., the data representing the recipient's name and identification number.

As illustrated in FIG. 1, the print-ready data 16 is transmitted to a print facility 18, which may be located locally with respect to the processing unit 14 or remotely therefrom. The print facility 18 may be, for example, a printer in direct connection with the processing unit 14 or may represent a printing service bureau. The print-ready data 16 may be transmitted from the processing unit 14 to the print facility 18 via, for example, one or more of an Internet, an intranet, a network, a private network, a public network, a virtual private network, a dedicated connection, a non-dedicated connection, a direct connection, an indirect connection, a dial-up connection, a permanent connection, a temporary connection, a wired communications link, a wireless communications link, a satellite communications link, a telecommunications link, a magnetic tape, a magnetic medium, etc. The print-ready data 16 may include formatted data, such as data formatted according to a printer control language. The print-ready data 16 may, in addition or alternatively, include raw data or formatted data, which requires further formatting or reformatting by the print facility 18.

While the record data 30 is described in the foregoing example as containing data representing a single piece of printed material 20, it should be understood that the record data 30 may include data representing a plurality of pieces of printed materials 20, including data representing plurality of formats, a plurality of types, a plurality of recipients, etc. thereof. It should also be understood that the printed materials 20 are not limited to the telephone calling card of the example described above. Rather, the printed materials 20 may include any type of printed matter, including, for example, a letter, a brochure, a flier, a presentation, etc. Furthermore, the printed material should be understood to include not only content printed on such media as paper, plastic, etc., and but also content output to electronic, magnetic, optical, magneto-optical, floptical, floppy, etc. media. In this regard, the printed material 20 may represent, for example, an e-mail message or other electronically transmitted data.

The printing system 10 according to the present invention further includes a viewing unit 22. The viewing unit 22 may include, for example, a display device and/or a print device, which may be provided locally with respect to the processing unit 14 or may be located remotely with respect to the processing unit 14. The viewing unit 22 may be configured for communication with the processing unit 14 via, for example, one or more of an Internet, an intranet, a network, a private network, a public network, a virtual private network, a dedicated connection, a non-dedicated connection, a direct connection, an indirect connection, a dial-up connection, a permanent connection, a temporary connection, a wired communications link, a wireless communications link, a satellite communications link, a telecommunications link, a magnetic tape, a magnetic medium, etc. The processing unit 14 is configured to perform a similar reading and assembly operation as that performed in outputting the print-ready data 16 except that the processing unit 14 prepares and assembles data representing the printed material 20 in a format that represents a viewable and/or printable image of the printed material 20. That is, the processing unit 14 is configured to generate and output data representing the printed materials 20 according to two formats—one used in printing the printed materials 20 at the print facility 18 and the other used to display and/or print an image or a facsimile representation of the printed materials 20. The processing unit 14 may be configured to generate the data representing the image of the printed materials 20 on demand, i.e., in real-time, "on-the-fly". This real-time generation of the data representing an image of the printed materials 20 reduces data storage requirements because the data representing an image of each piece of printed material 20 need not be stored in a data storage device. Rather, only the record data 30 corresponding to each piece of printed material 20 is stored, the data representing the image of the printed material 20 being generated in accordance with the record data 30 and library data 28 read from the library database 12, as more fully set forth above. The data representing the image of the printed material 20 may be in the form of, for example, a graphics file format, a portable document file format, a proprietary data file format, a non-proprietary data file format, etc., or a combination of data formats. The data representing the image of the printed material 20 may also be in the form of a device-independent format so that the image is displayable on a variety of display devices, not shown.

It should be appreciated that the foregoing method may be computer-controlled and that the method may be stored in a computer-readable medium as a set of instructions performed by a processor. The computer-readable medium may be, for example, a magnetic medium, an electronic medium, an optical medium, a magneto-optical medium, a CD-ROM, a DVD-ROM, a RAM, a ROM, etc.

Thus, the several aforementioned objects and advantages of the present invention are most effectively attained. Those skilled in the art will appreciate that numerous modifications of the example embodiment described hereinabove may be made without departing from the spirit and scope of the invention. Although a single example embodiment of the present invention has been described in detail herein, it should be understood that this invention is in no sense limited thereby and that its scope is to be determined by that of the appended claim.

What is claimed is:

1. A printing system comprising:
   a library database storage device configured to store library data, said library data including actual data representing a plurality of elements, including graphic, text, layout, and style elements for use in producing printed material;
   a creation device configured to define at least one piece of the printed material to be produced, the at least one piece of the printed material including at least one of the plurality of elements; and
   a data processing device configured to
   receive via a file transfer system, including the Internet, record data including recipient data relating to an intended recipient of the printed material, the recipient data including data representing a name of the intended recipient and an identification number for the intended recipient, and at least one identifier data corresponding to respective actual data contained in the library database storage device, and
   to read from the library database storage device the actual data corresponding to the at least one of the plurality of elements in accordance with the at least one piece of the printed material defined by the creation device and the at least one identifier data included in the record data received, and
   the data processing device further configured to generate data representing the at least one piece of the printed material in accordance with the actual data representing the selected one of the plurality of elements that is read from the library database storage device by the data processing device and the record data that is received via the file transfer system.

2. The printing system according to claim 1, wherein the data processing device is configured to transmit the generated data representing the at least one piece of the printed material to be printed to a print facility, the print facility being configured to generate the at least one piece of the printed material in accordance with the transmitted data.

3. The printing system according to claim 1, further comprising a print facility, the data processing device being configured to transmit the generated data representing the at least one piece of the printed material to be printed to the print facility, the print facility being configured to generate the at least one piece of the printed material in accordance with the transmitted data.

4. The printing system according to claim 1, wherein the library database storage device is configured to store library data transmitted via the file transfer system.

5. The printing system according to claim 1, wherein the processing unit device is further configured to generate data representing an image of the at least one piece of printed material to be printed.

6. The printing system according to claim 5, further comprising an output device configured to output the image.

7. The printing system according to claim 6, wherein the output device includes at least one of a display device configured to display the image and print device configured to print the image.

8. The printing system according to claim 5, wherein the generated data representing the image of the at least one piece of the printed material to be printed includes device-independent data.

9. The printing system according to claim 1, wherein the generated data representing the at least one piece of the printed material is electronically transmittable.

10. The printing system according to claim 1, wherein the library database storage device stores a library of components including graphic, text, layout and style elements, and wherein any selected ones of the elements can be included in the printed material to be printed in accordance with the identifier data contained in the record data, with the actual data representing selected ones of the elements being read by the processing device from the library database storage device.

11. The printing system according to claim 1, wherein the printed material is an identification card for the recipient, and wherein the generated data includes the recipient data, including the name of the intended recipient and the identification number for the intended recipient of the printed material to be printed.

12. The printing system according to claim 1, wherein the creation device is further configured to create at least one formatted content element via an online system.

13. A printing method comprising the steps of:
   storing library data representing a plurality of elements in a library database storage device, the library data including actual data representing graphic, text, layout and style elements for use in producing printed material;
   receiving record data transmitted via a file transfer system including the Internet, wherein the record data includes recipient data relating to an intended recipient of the printed material to be produced, the recipient data including data representing a name of the intended recipient and an identification number for the intended recipient, and at least one identifier data corresponding to respective actual data contained in the library database storage device for the least one of the plurality of elements;
   defining at least one piece of printed material to be produced, the at least one piece of the printed material including the at least one of the plurality of elements;
   reading from the library database storage device the actual data corresponding to the at least one of the plurality of elements in accordance with the at least one piece of the printed material defined in the defining step and the identifier data included in the record data; and generating data representing the at least one piece of the printed material in accordance with the record data that is received via the Internet and the actual data read from the library database storage device.

14. The method according to claim 13, further comprising the step of transmitting the data representing the at least one piece of the printed material to be printed to a print facility.

15. The method according to claim 14, further comprising the step of generating the at least one piece of the printed material to be printed by the print facility.

16. The method according to claim 13, further comprising the step of transmitting the library data to the storage device via the file transfer system.

17. The method according to claim 13, further comprising the step of generating data representing an image of the at least one piece of printed material to be printed.

18. The method according to claim 17, further comprising the step of outputting the image on an output device.

19. The method according to claim 18, wherein the outputting step includes at least one of displaying the image on a display device and printing the image on a print device.

20. The method according to claim 17, wherein the data representing the image includes device-independent data.

21. The method according to claim 13, wherein the generated data representing the at least one piece of the printed material is electronically transmittable.

22. The method according to claim 13, wherein the library database storage device stores a library of components including graphic, text, layout and style elements, and wherein any selected ones of the elements can be included in the printed material to be printed in accordance with the identifier data contained in the record data, with the actual data representing selected ones of the elements being read from the library database storage device.

23. The method according to claim 13, wherein the printed material is an identification card for the recipient, and wherein the generated data includes the recipient data including the name of the intended recipient and the identification number for the intended recipient of the printed material.

24. The method according to claim 13, further comprising the step of creating at least one formatted content element via an online system.

25. A printing method comprising the steps of:

storing library data including actual data representing a plurality of elements in a library database storage device, the elements including graphic, text, layout and style elements for use in producing printed material;

receiving record data transmitted via the Internet, the record data including recipient data relating to an intended recipient of the printed material to be produced, the recipient data including data representing a name of the intended recipient and an identification number for the intended recipient, and at least one identifier data corresponding to respective actual data contained in the library database storage device for the at least one of the plurality of elements;

defining at least one piece of printed material, at least one piece of the printed material including at least one of the plurality of elements;

reading from the library database storage device the actual data corresponding to the at least one of the plurality of elements in accordance with the at least one piece of the printed material defined in the defining step and the identifier data included in the record data; and generating data representing the at least one piece of the printed material in accordance with the actual data that is read from the library database storage device and the record data that is received via the Internet.

26. The printing method according to claim 25, wherein the method further includes the step of transmitting the data representing the at least one piece of the printed material to be printed to a print facility.

27. The printing method according to claim 26, wherein the method further includes the step of generating the at least one piece of the printed material to be printed by the print facility.

28. The printing method according to claim 25, wherein the method further includes the step of transmitting the library data to the storage device via a file transfer system.

29. The printing method according to claim 25, wherein the method further includes the step of generating data representing an image of the at least one piece of printed material to be printed.

30. printing method according to claim 29, wherein the method further includes the step of outputting the image on an output device.

31. The printing method according to claim 30, wherein the outputting step includes at least one of displaying the image on a display device and printing the image on a print device.

32. The printing method according to claim 29, wherein the data representing the image includes device-independent data.

33. The printing method according to claim 25, wherein the generated data representing the at least one piece of the printed material is electronically transmittable.

34. The printing method according to claim 25, wherein the library database storage device stores a library of components including graphic, text, layout and style elements, and wherein any selected ones of the elements can be included in the printed material in accordance with the identifier data contained in the record data, with the actual data representing selected ones of the elements being read by the processing device from the library database storage device.

35. The printing method according to claim 25, wherein the printed material is an identification card for the recipient, and wherein the generated data includes the recipient data including the name of the intended recipient and the identification number for the intended recipient of the printed material.

36. The printing method according to claim 25, wherein the method further includes the step of creating at least one formatted content element via an online system.

37. A computer-readable storage medium storing a set of instructions, the set of instructions capable of being executed by a processor arrangement to implement a printing method, the printing method comprising the steps of:

storing library data including actual data representing a plurality of elements in a library database storage device, the elements including graphic, text, layout and style elements for use in producing printed material to be produced;

receiving record data via transmitted via a file transfer system including the Internet, the record data including recipient data relating to an intended recipient of the printed material to be produced, the recipient data including data representing a name of the intended recipient and an identification number for the intended recipient, and at least one identifier data corresponding to respective actual data contained in the library database storage device for the at least one of the plurality of the elements;

defining at least one piece of printed material, the at least one piece of the printed material including the at least the one of the plurality of elements;

reading from the library database storage device actual data corresponding to the at least one of the plurality of elements in accordance with the at least one piece of the printed material defined in the defining step and the identifier data included in the record data; and generating data representing the at least one piece of the printed material in accordance with the record data that is received via the Internet and the actual data read from the library database storage device.

38. The computer-readable storage medium according to claim 37, wherein the method further comprises the step of transmitting the data representing the at least one piece of the printed material to be printed to a print facility.

39. The computer-readable storage medium according to claim 38, wherein the method further comprises the step of generating the at least one piece of the printed material to be printed by the print facility.

40. The computer-readable storage medium according to claim 37, wherein the method further comprises the step of transmitting the library data to the library database storage device via the file transfer system.

41. The computer-readable storage medium according to claim 37, wherein the method further comprises the step of generating data representing an image of the at least one piece of printed material to be printed.

42. The computer-readable storage medium according to claim 41, wherein the method further comprises the step of outputting the image on an output device.

43. The computer-readable storage medium according to claim 42, wherein the outputting step includes at least one of displaying the image on a display device and printing the image on a print device.

44. The computer-readable storage medium according to claim 41, wherein the data representing the image includes device-independent data.

45. The computer-readable storage medium according to claim 37, wherein the generated data representing the at least one piece of the printed material is electronically transmittable.

46. The computer-readable storage medium according to claim 37, wherein the library database storage device stores a library of components including graphic, text, layout and style elements, and wherein any selected ones of the elements can be included in the printed material to be printed in accordance with the identifier data contained in the record data, with the actual data representing selected ones of the elements being read by the processing device from the library database storage device.

47. The computer-readable storage medium according to claim 37, wherein the printed material is an identification card for the recipient, and wherein the generated data includes the recipient data including the name of the intended recipient and the identification number for the intended recipient of the printed material.

48. The computer-readable storage medium according to claim 37, wherein the method further comprises the step of creating at least one formatted content element via an online system.

* * * * *

UNITED STATES PATENT AND TRADEMARK OFFICE
CERTIFICATE OF CORRECTION

PATENT NO.        : 7,180,617 B2
APPLICATION NO.   : 09/861339
DATED             : February 20, 2007
INVENTOR(S)       : John Dibiasi et al.

It is certified that error appears in the above-identified patent and that said Letters Patent is hereby corrected as shown below:

TITLE PAGE, ITEM (73) ASSIGNEE: "Metavante Corporation" should be --Printing for Systems, Inc.--

Col. 8, Line 30 "printing method" should be --The printing method--

Signed and Sealed this

Twenty-sixth Day of February, 2008

JON W. DUDAS
*Director of the United States Patent and Trademark Office*